United States Patent [19]
Alfrey

[11] Patent Number: 4,867,930
[45] Date of Patent: * Sep. 19, 1989

[54] PRILLER METHOD

[76] Inventor: Norval K. Alfrey, Rte. 9, P.O. Box 464, Lake City, Fla. 32055

[*] Notice: The portion of the term of this patent subsequent to Mar. 24, 2004 has been disclaimed.

[21] Appl. No.: 28,767

[22] Filed: Mar. 23, 1987

Related U.S. Application Data

[63] Continuation-in-part of Ser. No. 311,462, Oct. 14, 1981, Pat. No. 4,652,295, which is a continuation-in-part of Ser. No. 209,489, Nov. 24, 1980, abandoned, which is a continuation-in-part of Ser. No. 78,085, Sep. 24, 1979, abandoned.

[51] Int. Cl.$^4$ ............... B29B 9/08; B29B 9/10; B29C 67/02
[52] U.S. Cl. ............... 264/6; 23/313 R; 71/34; 71/43; 71/64.05; 71/64.06; 264/13; 264/37; 264/117; 425/222
[58] Field of Search ............... 264/7, 117, 6, 37, 13; 425/222; 23/313 R; 423/310, 312, 313; 71/64.05, 64.06, 64.13, 34, 43

[56] References Cited

U.S. PATENT DOCUMENTS

| | | | |
|---|---|---|---|
| 2,741,545 | 4/1956 | Nielsson | 71/43 |
| 3,295,838 | 1/1967 | Ban | 425/222 |
| 3,345,443 | 10/1967 | Ziegler et al. | 264/117 |
| 3,449,106 | 6/1969 | Paden et al. | 425/222 |
| 3,533,829 | 10/1970 | Quanquin | 71/34 |
| 3,689,607 | 9/1972 | Backlund | 264/37 X |
| 3,751,543 | 8/1973 | Hare | 264/117 |
| 4,076,773 | 2/1978 | Mahl, Jr. et al. | 264/13 |
| 4,108,932 | 8/1978 | Takewell et al. | 264/37 |
| 4,157,371 | 6/1979 | Paulson et al. | 264/114 |
| 4,213,924 | 7/1980 | Shirley, Jr. | 264/7 |
| 4,341,739 | 7/1982 | Ellis et al. | 422/207 |

Primary Examiner—Jan H. Silbaugh
Assistant Examiner—Mary Lynn Fertig
Attorney, Agent, or Firm—William David Kiesel; Robert C. Tucker; Timothy J. Monahan

[57] ABSTRACT

A process for producing desired sized product granules characterized by dispensing on a flat moving horizontal bed product particulates from a heat exchange assembly, then mixing the product particulates with seed material by a mixing means for a period of time to produce the desired sized product granules.

5 Claims, 6 Drawing Sheets

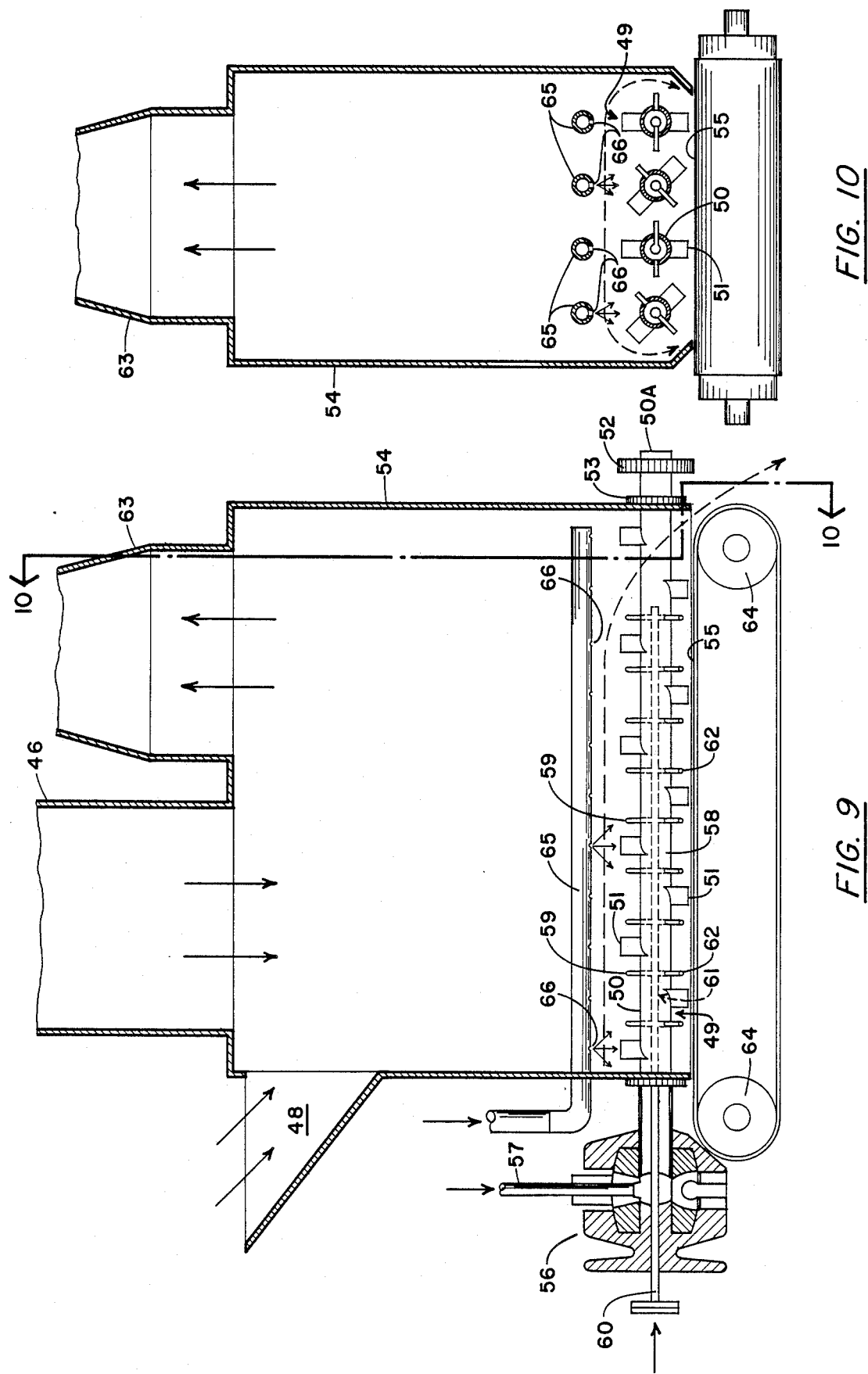

PRILLER METHOD

RELATED APPLICATIONS

This is a continuation-in-part of Ser. No. 311,462, filed 10/14/81 now U.S. Pat. No. 4,652,295 issued Mar. 24, 1987 to the inventor herein and entitled "Fertilizer Manufacture", which patent is continuation-in-part application of U.S. patent application Ser. No. 209,489, filed Nov. 24, 1980, now abandoned, by the inventor herein and entitled "Fertilizer Manufacture" which application in turn is a continuation-in-part of U.S. patent application Ser. No. 078,085, filed Sept. 24, 1979, now abandoned, by the inventor herein and entitled "Fertilizer Manufacture," mention of which is made herein for the purposes of obtaining benefit of their earlier filing dates.

BACKGROUND OF THE INVENTION

1. Field of the Invention

This invention relates to the prilling and granulation of material, and more particularly to the processes and apparatus to produce uniformily sized product particulates of pre-determined size.

2. Prior Art

The process of prilling and granulation of materials has been extensively studied and numerous processes have been devised in fields as diverse as conversion of urea melt to relatively close-sized prills; agglomeration of ammonia nitrate melt into closely sized prills; removal of free and chemically combined moisture from most organic and inorganic compositons whether in liquid slurry or melt form, as well as, with organic and inorganic solids of crystalline and amorphous types; heat removal from most organic and inorganic solids; crushing coal rock and phosphate utilizing gravity features; concentration of mineral values to commercially desirable concentrations; increasing the single train capacity when nodulizing iron ores; and achieving a two mole ammonia reacted per mole of phosphoric acid for producing diammonia phosphate having less than 5% moisture content. However, in each instance it has always been desirable to obtain a process and equipment to carry out the process which is simplified and energy efficient. This has been particularly true in the manufacture of fertilizers.

SUMMARY OF THE INVENTION

It is an object of this invention to provide a simplified process for the production of uniformly sized granular particules of desired size.

Another object of this invention is to provide a less expensive and more energy efficient process for the production of uniformly sized granular particules of desired size.

Other objects and advantages of this invention shall become obvious from the ensuing descriptions of the invention.

Accordingly, a process for the production of granular particules is provided comprising discharging reaction products from a heat transfer means on a moving flat horizontal conveyor bed containing dry product feed where the combination is then mixed with reactants and agitated by moving blades positioned above the surface of the bed.

BRIEF DESCRIPTION OF THE DRAWINGS

FIG. 6 is an alternate preferred embodiment of the controlled dispersion reactor.

FIG. 7 is a cross-sectional view taken along lines 7—7 or FIG. 6.

FIG. 9 is a cross-sectional view taken along lines 9—9 or FIG. 8.

FIG. 10 is a cross-sectional view taken along lines 10—10 of FIG. 9.

PREFERRED EMBODIMENTS OF THE INVENTION

Figure 1:
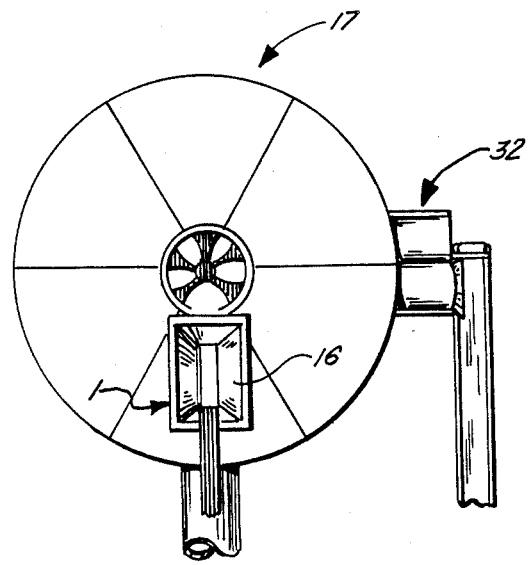
FIG. 1 is a three-dimensional, top view of a preferred embodiment of this invention.
Figure 2:
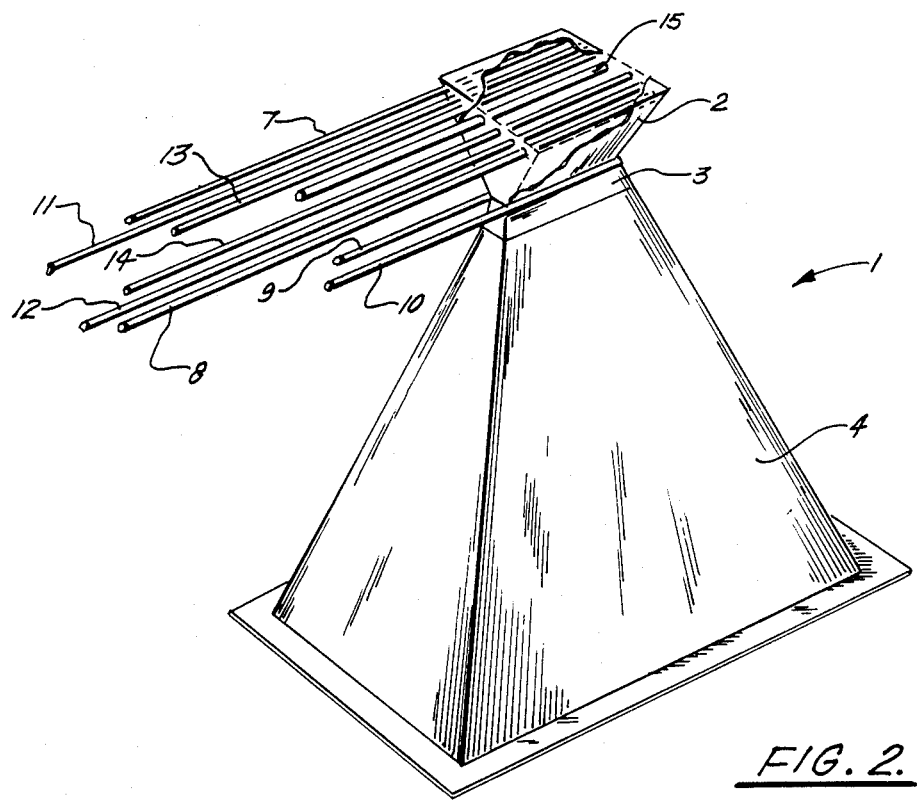
FIG. 2 is a three-dimensional, elevated view illustrating a preferred embodiment of the controlled dispersion reactor.
Figure 3:
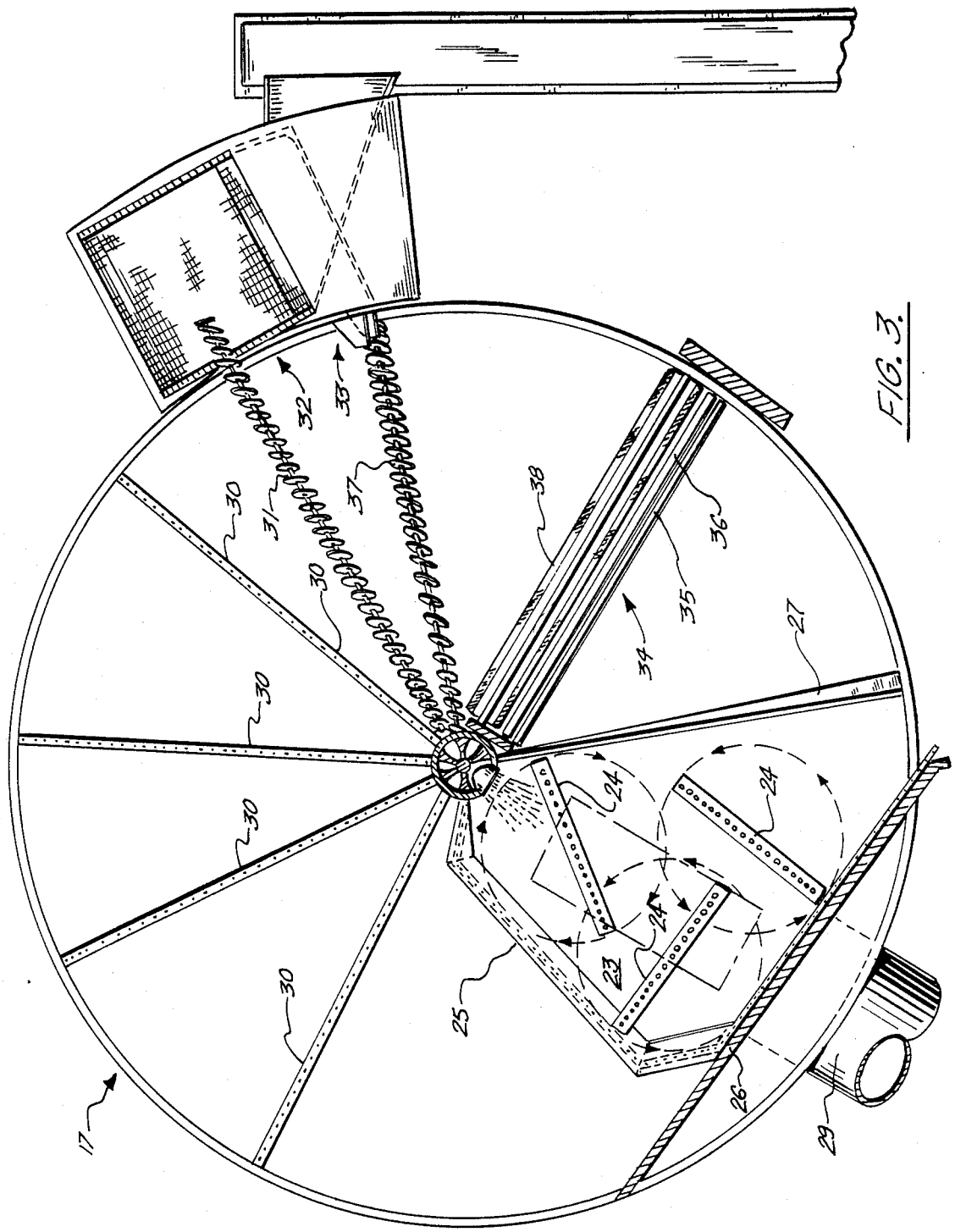
FIG. 3 is a three-dimensional, cutaway top view of preferred embodiment of this invention.
Figure 4:
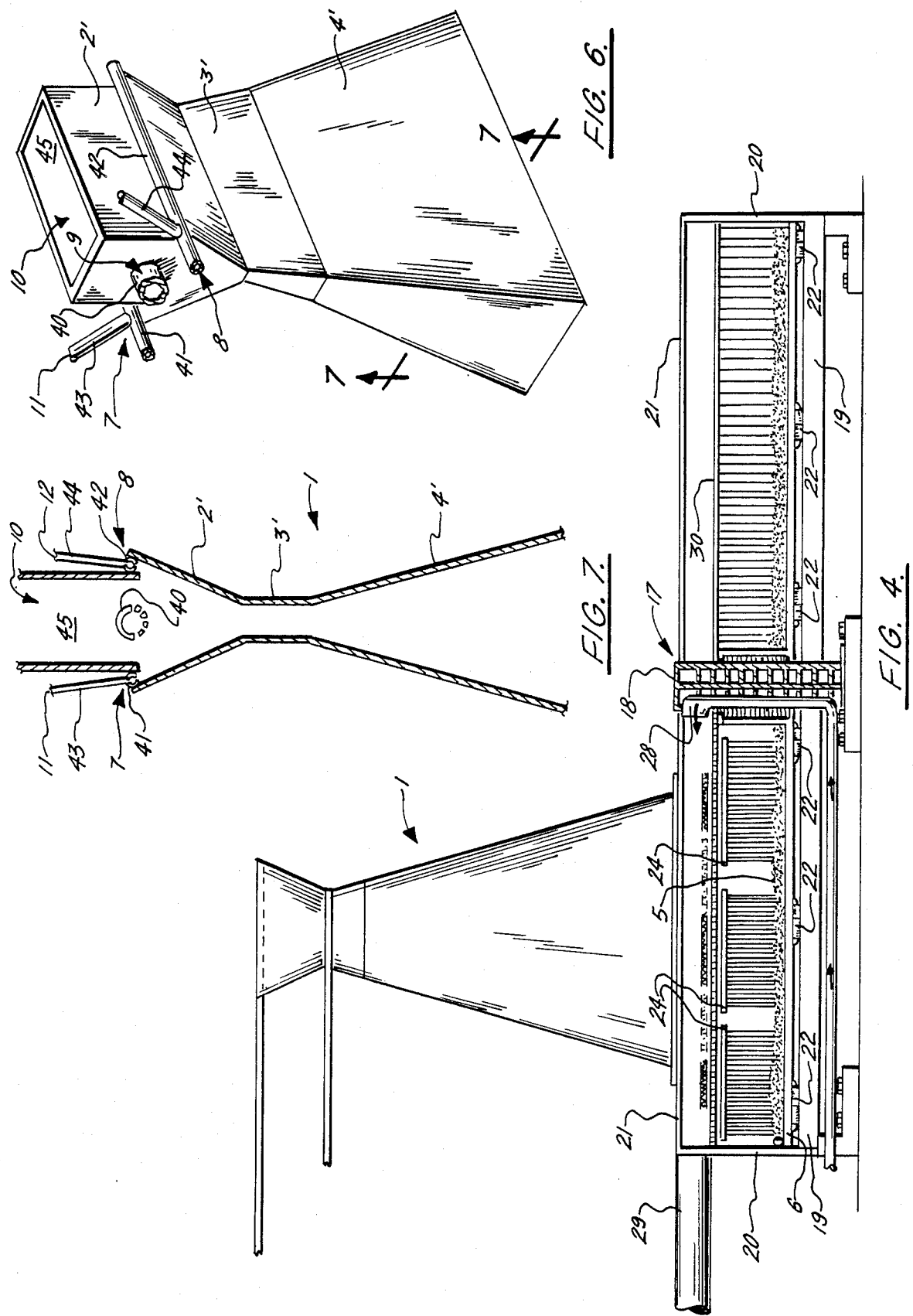
FIG. 4 is a three-dimensional, elevated view illustrating a preferred embodiment of the mixing zone.
Figure 5:
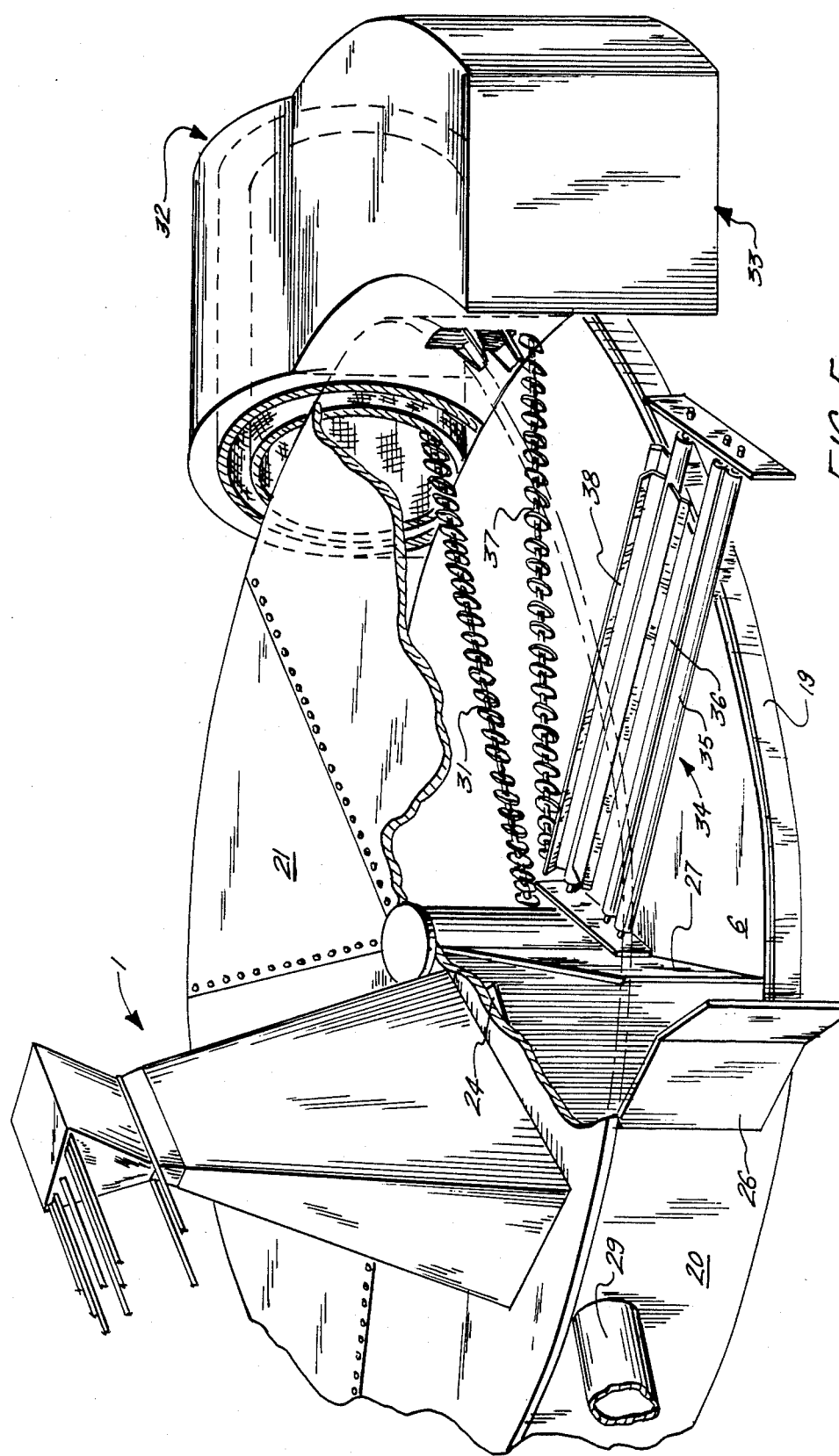
FIG. 5 is a three-dimensional, elevated view illustrating a preferred embodiment of the fertilizer sizing assembly.

Without any intent to limit the scope of this invention the preferred embodiments of this invention shall be discussed utilizing a process for producing a phosphate fertilizer.

Also, for purposes of this invention, a "controlled dispersion reactor" shall mean an apparatus having a convergent inlet section which swages to an orifice section connecting to divergent exiting or discharge section.

Turning now to FIGS. 1–7, preferred embodiments of the apparatus utilized to carry out the processes of this invention can be seen. In its more basic form, the equipment comprises a controlled dispersion reactor, denoted generally by the numeral 1, having a convergent inlet section 2 for receiving the acid ammonia and other reactants. Inlet section 2 swages to an orifice section 3 where the reactants are contacted together before being discharged through a divergent discharge section 4 onto seed material 5 lying on revolving table 6 of a chamber assembly denoted generally by the numeral 17.

In a preferred embodiment, phosphoric acid, and, if desired, sulphuric acid, along with the recycling partially neutralized phosphoric acid solution obtained from a scrubber system as explained below, is introduced to inlet section 2 through lines 7 and 8 located at the top end of inlet section 2 and ammonia is introduced through lines 9 and 10 located at the lower end of inlet section 2 and through line 15 located in the upper region of the inlet section 2. In a preferred embodiment lines 11, 12, 13 and 14 can be provided to allow for the introduction of steam and/or air to provide better control of the reaction products produced.

In a preferred embodiment, orifice section 3 is sized so that the reaction products are in reacting contact for less than two seconds before being propelled into discharge section 4 preferably at velocities between 5–600 feet per second. More preferably, the reaction time in orifice section 3 will be between 0.05–1.0 seconds.

In another preferred embodiment, discharge section 4 comprises closed hooded walls 16 having a continuously increasing cross sectional area. This embodiment provides for better control of resultant product particle size, thus reducing effluent problems and providing for better reaction control between the resultant products and seed material.

FIGS. 6 and 7 illustrate a preferred alternate embodiment of controlled dispersion reactor 1. In this embodiment, reactor 1 comprises, as before, a convergent inlet section 2', orifice section 3' and divergent discharge section 4' However, to facilitate construction of reactor 1, and provide for better contact between the phosphoric acid and ammonia and other reactant products, a preferred positioning of reactant product lines is desired. More particularly, line 40, utilized for introduction of ammonia, would be positioned between lines 41 and 42, utilized for introduction of phosphoric acid and/or other acids. Lines 43 and 44, utilized for introduction of the partially reacted ammonia-phosphoric acid liquor from the scrubber to inlet section 2', are connected to lines 41 and 42, respectively. Air or steam can then be introduced directly into opening 45 of convergent inlet section 2'.

Chamber assembly 17 comprises table 6 which revolves about a center axis assembly 18. Table 6 is maintained in an enclosure formed by floor 19, walls 20 and cover 21 and supported above floor 19 by rollers 22 as shown. As seen more clearly in FIG. 3, the resultant products are discharged into a mixing zone 23 where mixers 24 mix the resultant product with seed material 5. In a preferred embodiment, seed material 5 comprises small particles of the desired fertilizer product.

In another preferred embodiment, mixing zone 23 is segregated from other sections of table 6 by partitions 25, 26 and 27. In this embodiment, air exiting through duct 28 can be passed over the resultant products and seed material to help control their temperature and moisture content. This air and other reaction gases are then sucked through duct 29, which leads to a scrubber assembly (not shown) to recapture ammonia (by passing through phosphoric or other acid mist) for recycling to lines 7 and 8.

As table 6 revolves about axis 18, ammonia may be introduced to complete the ammoniation reactions, then the material preferably passes through several series of plows 30 to insure proper cooking and drying of the seed material and resultant products to achieve the desired fertilizer moisture content and temperature. By controlling the speed of table 6, the fertilizer pellets will achieve the desired moisture content and temperature by the time they reach conveyor screw 31, which removes a controlled portion of fertilizer pellets from table and onto screening assembly 32, which separates out the desired sized fertilizer pellets.

In a preferred embodiment, the rejected undersized or oversized fertilizer pellets are returned to table 6 by conventional transfer means 33 where they are spread evenly by conveyor screw 37. Then the preponderance of the material on table 6 is lifted by rotary device 38 and dropped and guided between a roller assembly 34 having rollers 35 and 36, which crush the pellets as they pass between the rollers. The crushed pellets then pass under partition 27 and into mixing zone 23.

Figure 8:
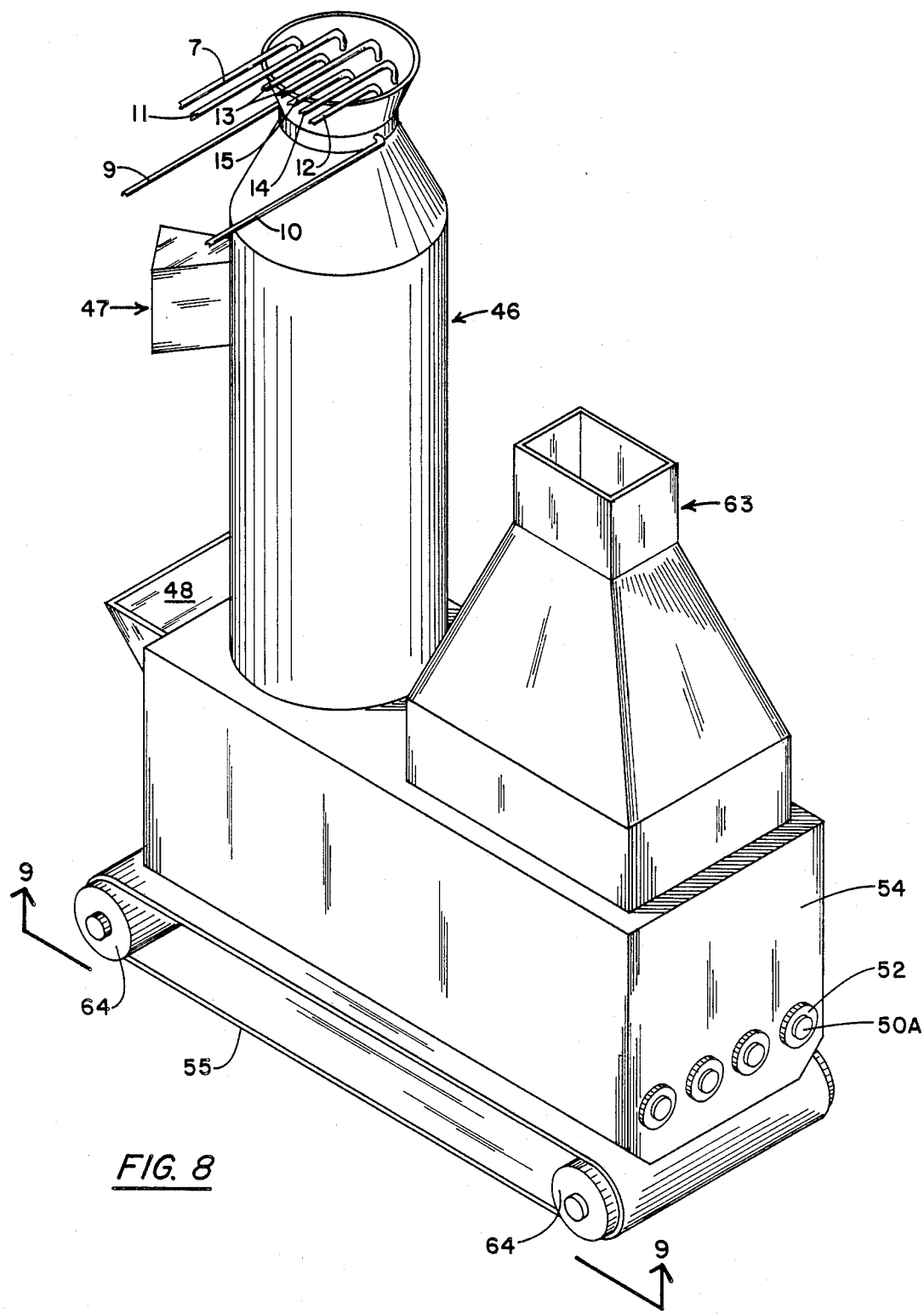
FIG. 8 is prespective view of alternate preferred embodiment of apparatus utilized in the invention.

Turning now to FIGS. 8-10, an alternate preferred embodiment of the equipment used is illustrated. In this embodiment, the controlled dispersion reactor 1 is mounted atop cyclone tower 46 which is utilized to add or remove heat from the reaction products being dispersed from the reactor 1. One way this can be achieved is to flow hot or cold inert or reaction gases through orifice 47 located below divergent discharge section 4 into cyclone tower 46.

The reaction products from cyclone tower 46 fall onto the dry feed such as recycle product or new feedstock which has already been placed on the top flat horizontal surface of conveyor belt 55 through entry opening 48 to form a bed of materials.

Positioned above conveyor belt 55 and parallel to one another is a series of mixing assemblies 49. In a preferred embodiment each assembly 49 comprises a hollow shaft 50 that is sealed at one end, 50A, and to which is attached along its outer perimeter a series or mixing blades 51. At one end of shaft 50 is sprocket assembly 52 for operatively attaching to a rotary drive means so as to be able to rotate shaft 50. Shaft 50 is held in position by support bearings 53 which are connected to housing hood 54 positioned about bed 55.

In another perferred embodiment a two fluid swivel coupling assembly 56 is operatively connected at the other end of hollow shaft 50 to allow multiple fluids to be introduced to the bed More particularly, a first fluid (such as ammonia) can be introduced through pipe 57 and into shaft cavity 58 and exited through shaft openings 59. A second fluid (such as an acid) can be introduced through pipe 60 and into line 61 that runs through the center of cavity 58 and exited through pipe openings 62 into the bed.

The rotation of the multiple shaft blades causes mixing or the bed materials. Then by controlling the time that the products remain in the bed, as well as by the amount or reactants added through pipes 57 and 60, and the amount or feedstock and reaction products introduced to the bed it is possible to produce the desired sized products.

The final product is automatically removed from the bed by the rotation of the conveyor surface by rollers 64, and if desired dumped onto a screening assembly to remove undesired sized particles which can be recycled as feedstock. Although the reactions necessary to produce the desired particles can in many cases be achieved without the movement of the conveyor surface, it is preferred for most processes that the conveyor belt be moving at up to 30 feet/second, and in the case of most fertilizer processes that the conveyor belt be moving at up to 10 feet/second.

Any gases produced by the mixing of bed materials are vented through an exiting assembly 63 which could include conventional demisters and other pollution abatement devices.

In an alternate embodiment a series of conventional header lines 65 through which fluidizing gases may be introduced are positioned above bed 55. Each line 65 has long narrow slits 66 through which the fluidizing gases pass under pressure and are directed toward the top surface of bed 55. This action results in a fluidizing action in the upper regions of bed 55, and allows for more efficient heat transfer to occur between the fluidizing gases and the particles comprising bed 55.

In addition to the specific preferred embodiments of the invention described above, the novel concepts disclosed can also be used in the design of process and apparatus for converting urea melt to relatively close sized prills; process and apparatus to agglomerate ammonia nitrate melt into closely sized prills; process and apparatus to remove free and chemically combined moisture from most organic and inorganic compositions whether in liquid slurry or melt form, as well as, with organic and inorganic solids of crystalline and amorphous types; processes and apparatus for heat removal from most organic and inorganic solid; process and apparatus for crushing coal rock and phosphate utilizing gravity features; process and apparatus for concentration of mineral values to commercially desirable letters; process and apparatus for increasing the single train capacity when nodulizing iron ores; and process and apparatus for achieving a two mole of ammonia reacted per mole or phosphoric acid ($H_3PO_4$) for producing diammonia phosphate having less than 5% moisture content.

There are, of course, many alternate embodiments of the invention not specifically disclosed, but which are intended to be within the scope of this invention as defined by the following claims.

What I claim is:

1. A process for producing a granular reaction product comprising the steps of:
   (a) introducing a plurality of reactants into a controlled dispersion reactor to produce a dispersion of reaction product melt;
   (b) discharging said reaction product melt into an upper opening of a vertical heat exchange tower;
   (c) introducing a gas into said tower wherein said gas is selected from the group consisting of a heating gas, cooling gas and reactant gas;
   (d) discharging said reaction product melt onto a bed positioned beneath said tower, said bed containing dry recycled reaction product; and
   (e) mixing said reaction product melt with said recycled reaction product by rotating an elongated mixing assembly having an axis substantially parallel to said bed, said assembly having a plurality of protruding mixing blades positioned in said bed.

2. A process according to claim 1, further comprising the steps of introducing a fluid into an interior tube of said mixing assembly through a swivel coupling while said assembly is rotating, followed by dispersing said fluid through a plurality of openings in said mixing assembly.

3. A process according to claim 2 wherein said tower has a circular cross section and said gas is introduced tangetially to an interior of said tower 4. A process according to claim 3 wherein said bed is a travelling horizontal conveyor surface.

5. A process according to claim 3 wherein said reaction product melt is dispersed from said reactor at a velocity between 5 and 600 feet per second.

* * * * *